US012510844B2

(12) United States Patent
Tanaka et al.

(10) Patent No.: US 12,510,844 B2
(45) Date of Patent: Dec. 30, 2025

(54) TONER ACCOMMODATING CONTAINER

(71) Applicant: CANON KABUSHIKI KAISHA, Tokyo (JP)

(72) Inventors: Masatake Tanaka, Kanagawa (JP); Daisuke Baba, Shizuoka (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/812,648

(22) Filed: Aug. 22, 2024

(65) Prior Publication Data

US 2024/0411244 A1 Dec. 12, 2024

Related U.S. Application Data

(63) Continuation of application No. PCT/JP2023/000435, filed on Jan. 11, 2023.

(30) Foreign Application Priority Data

Mar. 2, 2022 (JP) ................................ 2022-031490

(51) Int. Cl.

| | |
|---|---|
| ***G03G 15/08*** | (2006.01) |
| ***G03G 9/08*** | (2006.01) |
| ***G03G 9/097*** | (2006.01) |
| ***G03G 21/16*** | (2006.01) |

(52) U.S. Cl.

CPC ....... *G03G 15/0874* (2013.01); *G03G 9/0802* (2013.01); *G03G 9/0821* (2013.01); *G03G 9/09725* (2013.01); *G03G 21/1676* (2013.01); *G03G 2215/0682* (2013.01)

(58) Field of Classification Search

CPC ............... G03G 9/0802; G03G 9/0821; G03G 9/09725; G03G 15/0874; G03G 21/1676
USPC .................... 399/254, 258; 430/108.7, 109.1
See application file for complete search history.

(56) References Cited

U.S. PATENT DOCUMENTS

| | | | | |
|---|---|---|---|---|
| 8,377,616 | B2 | 2/2013 | Tani et al. | |
| 8,628,899 | B2 | 1/2014 | Kawamura et al. | |
| 8,815,484 | B2 | 8/2014 | Tanaka et al. | |
| 8,918,025 | B2 * | 12/2014 | Tohmatsu .......... | G03G 15/0879 399/258 |

(Continued)

FOREIGN PATENT DOCUMENTS

| | | |
|---|---|---|
| JP | 2003-285887 A | 10/2003 |
| JP | 2006-208431 A | 8/2006 |

(Continued)

OTHER PUBLICATIONS

U.S. Appl. No. 18/749,980, filed Jun. 21, 2024, Yosuke Sugitani.

*Primary Examiner* — Hoan H Tran
(74) *Attorney, Agent, or Firm* — VENABLE LLP

(57) ABSTRACT

There is used a toner accommodating container including: a bag-shaped accommodating portion having flexibility; and a toner accommodated in the accommodating portion, and including a silica particle. The toner has a value of Total Energy of 300 mJ or less in measurement of the Total Energy when a propeller type blade is caused to penetrate a surface of a powder layer of the toner manufacturing by applying a vertical load of 88 kPa in a measurement container in a powder flowability measurement device while the propeller type blade is being rotated at a peripheral speed of 100 mm/see of an outermost edge portion thereof.

13 Claims, 6 Drawing Sheets

(56) References Cited

U.S. PATENT DOCUMENTS

| | | | |
|---|---|---|---|
| 9,158,216 | B2 | 10/2015 | Shimano et al. |
| 9,213,250 | B2 * | 12/2015 | Nomura ............. G03G 9/09725 |
| 9,377,705 | B2 | 6/2016 | Shimano et al. |
| 9,383,668 | B2 | 7/2016 | Noji et al. |
| 9,500,972 | B2 | 11/2016 | Tanaka et al. |
| 9,575,424 | B2 | 2/2017 | Nakagawa et al. |
| 9,575,461 | B2 * | 2/2017 | Akiyama ............... G03G 15/08 |
| 9,599,919 | B2 | 3/2017 | Isono et al. |
| 9,658,549 | B2 | 5/2017 | Tanaka et al. |
| 9,785,071 | B2 | 10/2017 | Shimano et al. |
| 9,829,816 | B2 | 11/2017 | Tanaka et al. |
| 9,835,964 | B2 | 12/2017 | Yoshida et al. |
| 9,904,193 | B2 | 2/2018 | Nakagawa et al. |
| 9,958,801 | B2 | 5/2018 | Tanaka et al. |
| 10,054,866 | B2 | 8/2018 | Tanaka et al. |
| 10,228,630 | B2 * | 3/2019 | Mizuguchi ......... G03G 9/09791 |
| 10,845,721 | B2 | 11/2020 | Tanaka et al. |
| 10,942,466 | B2 | 3/2021 | Tominaga et al. |
| 10,976,679 | B2 | 4/2021 | Tanaka et al. |
| 11,003,104 | B2 | 5/2021 | Katsura et al. |
| 11,003,105 | B2 | 5/2021 | Sato et al. |
| 11,169,460 | B2 | 11/2021 | Kototani et al. |
| 11,249,408 | B2 | 2/2022 | Tsuda et al. |
| 11,829,105 | B2 | 11/2023 | Suzuki et al. |
| 12,124,212 | B2 | 10/2024 | Kawaguchi et al. |
| 2006/0166123 | A1 | 7/2006 | Masuda |
| 2016/0041520 | A1 | 2/2016 | Akiyama |
| 2021/0088919 | A1 | 3/2021 | Noguchi |
| 2021/0103246 | A1 | 4/2021 | Morihara |
| 2021/0263446 | A1 | 8/2021 | Funatani |
| 2023/0042289 | A1 | 2/2023 | Tanaka et al. |
| 2023/0273539 | A1 | 8/2023 | Katsura et al. |
| 2023/0273543 | A1 | 8/2023 | Tanaka et al. |
| 2024/0036493 | A1 | 2/2024 | Kototani et al. |
| 2024/0219852 | A1 | 7/2024 | Tanaka et al. |

FOREIGN PATENT DOCUMENTS

| | | | |
|---|---|---|---|
| JP | 2008-292584 | A | 12/2008 |
| JP | 2011-69955 | A | 4/2011 |
| JP | 2012-25596 | A | 2/2012 |
| JP | 2016-24330 | A | 2/2016 |
| JP | 2016-38589 | A | 3/2016 |
| JP | 2020-86450 | A | 6/2020 |
| JP | 2020-160419 | A | 10/2020 |
| JP | 2021-47320 | A | 3/2021 |
| JP | 2021-60510 | A | 4/2021 |

* cited by examiner

TONER ACCOMMODATING CONTAINER

CROSS-REFERENCE TO RELATED APPLICATIONS

This application is a Continuation of International Patent Application No. PCT/JP2023/000435, filed Jan. 11, 2023, which claims the benefit of Japanese Patent Applications No. 2022-031490, filed Mar. 2, 2022, which is hereby incorporated by reference herein in their entirety.

BACKGROUND OF THE INVENTION

Field of the Invention

The present invention relates to a toner accommodating container.

Background Art

An image forming apparatus of an electrophotographic system forms an image by transferring a toner image, formed on the surface of a photosensitive drum using a toner as a developer, onto a transfer material (recording material) as a recording medium. With such an image forming apparatus, a toner replenishing system is known (PTL 1: Japanese Patent Application Publication No. 2020-086450). With an image forming apparatus of a toner replenishing system, when the toner of the toner accommodation part decreases, the toner accommodating portion of the image forming apparatus can be replenished with a toner by using a container accommodating a toner therein without replacing a process member such as a photosensitive drum or a developing roller.

CITATION LIST

Patent Literature

PTL1: Japanese Patent Application Publication No. 2020-086450

For an image forming apparatus of a toner replenishing system, a container capable of accommodating a toner in a toner accommodating portion is used. Thus, degradation of the toner accommodated in the toner accommodating portion is required to be reduced even when the toner accommodating container is stored or transported. Particularly, when the toner accommodating portion of the toner accommodating container is a flexible bag, the toner tends to form a compacted state due to the self weight of the toner, the external force applied from the bag, the external force upon loading storage, or the like, so that the toner tends to be deteriorated.

The present invention has been made in view of the foregoing problem. It is an object of the present invention to provide a technology for reducing the degradation of a toner even when the toner is accommodated in a flexible container.

SUMMARY OF THE INVENTION

The present invention adopts the following configuration. Namely, a toner accommodating container having;

a bag-shaped accommodating portion having flexibility; and a toner to be accommodated in the accommodating portion, and including a silica particle, wherein the toner has a value of Total Energy of 300 mJ or less in measurement of the Total Energy when a propeller type blade is caused to penetrate a surface of the powder layer of the toner manufactured by applying a vertical load of 88 kPa in a measurement container in a powder flowability measurement device while the propeller type blade is being rotated the blade at a peripheral speed of 100 mm/see of the outermost edge portion thereof.

The present invention can provide a technology for reducing the degradation of a toner even when the toner is accommodated in a flexible container.

Further features of the present invention will become apparent from the following description of exemplary embodiments with reference to the attached drawings.

DESCRIPTION OF THE EMBODIMENTS

Below, referring to the accompanying drawings, preferable embodiments of the present invention will be described exemplarily in details. However, the dimensions, the materials, the shapes of the constituent components described in the following Examples, and the relative layout thereof should be appropriately changed according to the configuration of the device to which the present invention is applied, and various conditions therefor. Therefore, it is not intended that the scope of the present invention is limited unless otherwise specified.

[Image Forming Apparatus]

Figure 1:
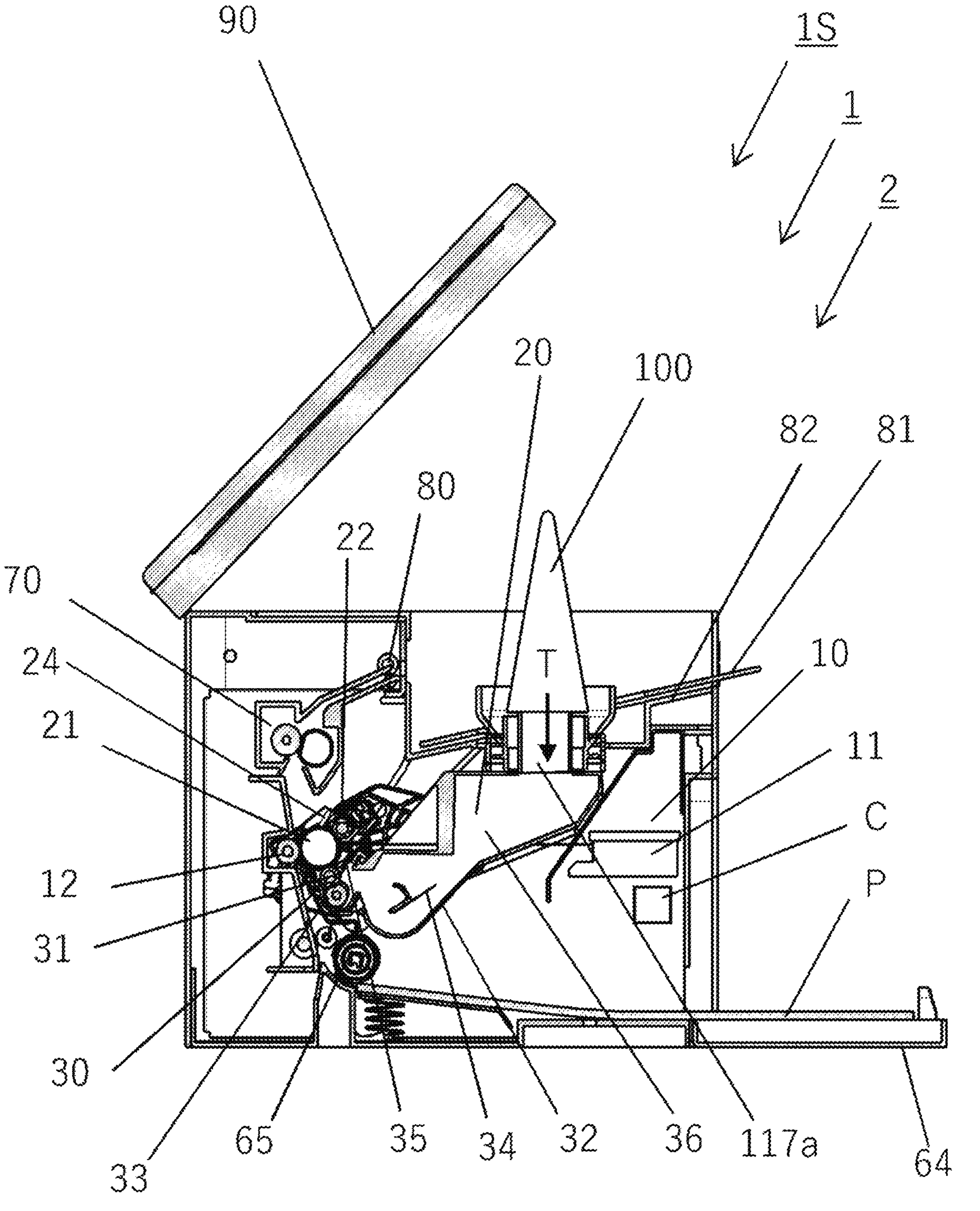
FIG. 1 is a schematic cross sectional view of an image forming system.
Figure 2:
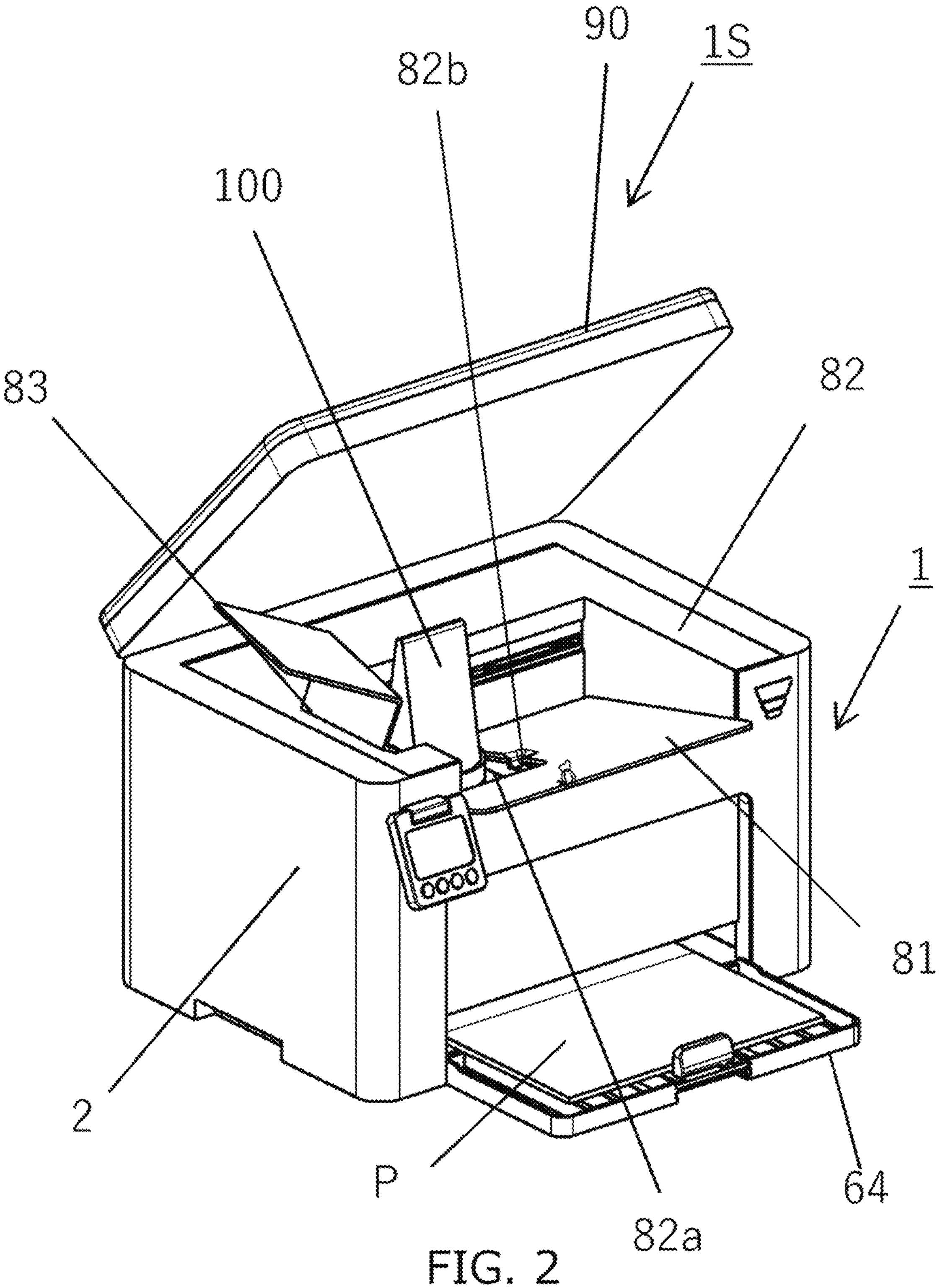
FIG. 2 is a perspective view of an image forming system.
Figure 3:
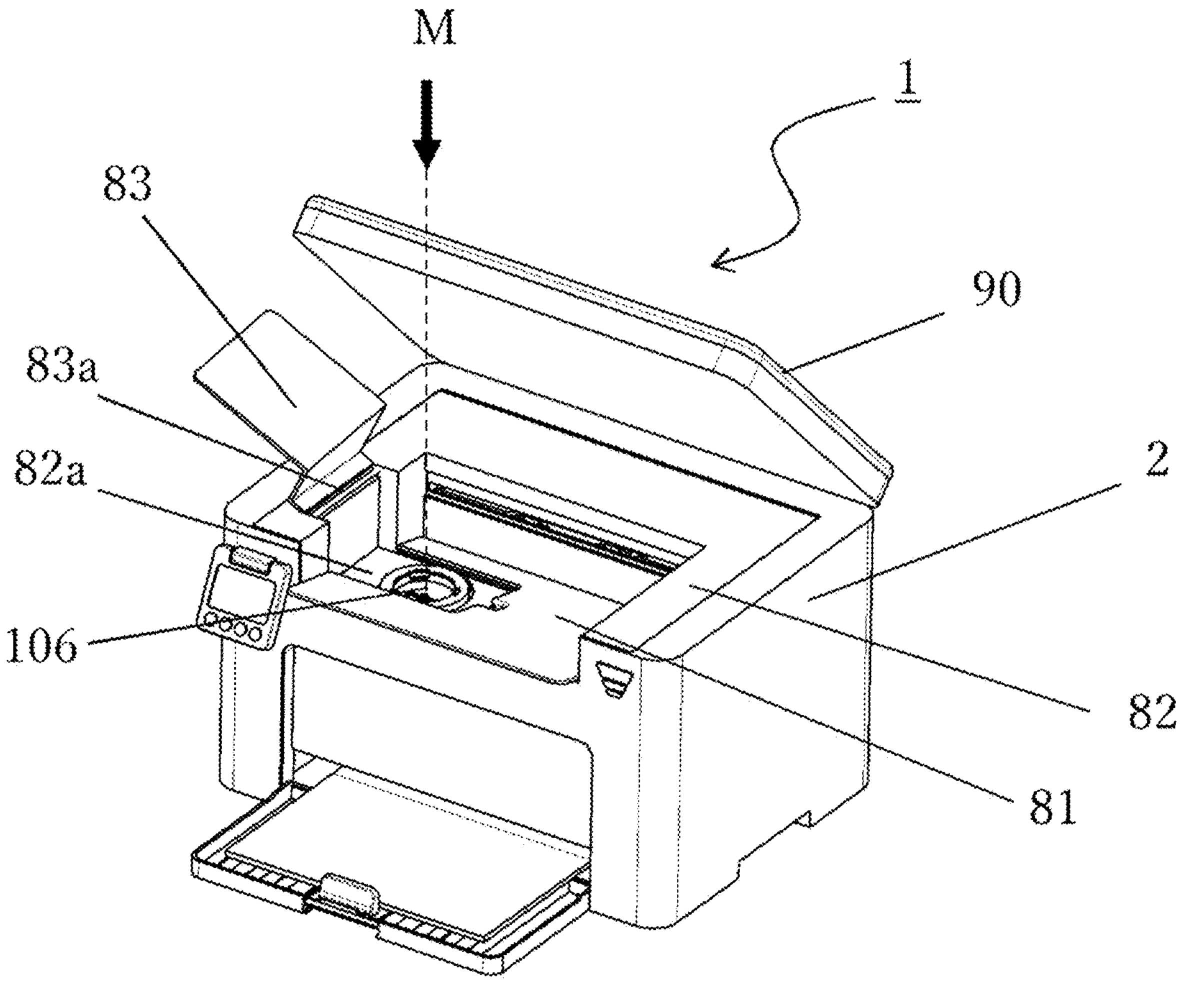
FIG. 3 is a perspective view of an image forming apparatus.

The outline of an image forming apparatus 1 using a toner pack of the present embodiment will be described. FIG. 1 is a schematic cross sectional view of an image forming system 1S including the image forming apparatus 1. FIG. 2 is a perspective view showing a configuration of the image forming system 1S including the image forming apparatus 1. FIG. 3 is a perspective view of a different direction from that of FIG. 2, showing the configuration of the image forming apparatus 1 with a toner pack 100 not mounted.

Herein, a description will be given to image forming apparatuses of a process cartridge system, an electrophotographic system, and a toner replenishing system as examples. However, the toner and the toner pack in accordance with the present invention are applicable to various image forming apparatuses not limited to such image forming apparatuses. The toner and the toner pack described in the following Examples are applicable when the toner is accommodated in a flexible bag. For example, the toner pack for use in an image forming apparatus of a system of replenishment by removal of a cartridge, a toner pack for storage or for transport, and the toner to be used therefor are also the objects of the present invention.

The present invention can be grasped as a toner pack (toner accommodating container) including an accommodating portion which is a flexible bag-shaped portion for accommodating a toner (developer). The present invention can also be grasped as a toner less deteriorated when accommodated in a flexible bag.

The image forming system 1S includes the image forming apparatus 1, and the toner pack 100 mounted at the image forming apparatus 1. The image forming apparatus 1 includes an apparatus main body 2 and a process cartridge 20 detachable with respect to the apparatus main body 2. The apparatus main body 2 has an image forming portion 10 for forming a toner image on a recording material P, a pick-up roller 65 for feeding the recording material P from a tray 64 to the image forming portion 10, a fixing portion 70 for fixing the toner image formed by the image forming portion 10 on the recording material P, and a discharge roller pair 80.

The image forming portion 10 has a scanner unit 11, a process cartridge 20 of an electrophotographic system, and a transfer roller 12 for transferring a toner image as a developer image formed by a photosensitive drum 21 of the process cartridge 20 onto the recording material P. The process cartridge 20 has a photosensitive drum 21, a charging roller 22 arranged around the photosensitive drum 21, a cleaning blade 24, and a developing apparatus 30.

The developing apparatus 30 includes a developing roller 31 as a developer carrying member for carrying a developer, a developer container 32 serving as the frame body of the developing apparatus 30, and a supply roller 33 capable of supplying a developer to the developing roller 31. The developer container 32 is provided with a toner accommodating chamber 36 for accommodating a toner, a stirring member 34 as a stirring member to be arranged in the inside of the toner accommodating chamber 36, and a developing blade 35. The developing apparatus 30 is provided with a cartridge opening 117*a* for receiving a nozzle 102 of the toner pack 100. The cartridge opening 117*a* is preferably closed by a cap or the like at other times than the time of toner replenishment.

The top of the apparatus main body 2 is provided with a top cover 82 as a loading tray. At the upper surface of the top cover 82, a discharge tray 81 as a loading surface is formed. At the top cover 82, an opening/closing member 83 is rotatably supported around a rotating axis 83*a*. The opening/closing member 83 can move between the opening state in which an opening 82*a* is exposed and the closed state in which the opening 82*a* is closed. FIGS. 2 and 3 show the opened state. At the discharge tray 81 of the top cover 82, the opening 82*a* opening upward is formed.

At the time of replenishment of a toner, a user inserts the toner pack 100 toward the mounting direction M (indicated with an arrow in FIG. 3) so that the nozzle 102 of the toner pack 100 overlaps a mounting portion 106. Then, the nozzle 102 is inserted into the toner accommodating chamber 36 through the opening 82*a* of the apparatus main body 2 and the cartridge opening 117*a* of the developing apparatus 30. As a result, as shown in FIG. 1, the toner T in the inside of the toner pack 100 moves to the toner accommodating chamber 36 by the gravitation.

The top of the top cover 82 is provided with a reading apparatus 90 for reading the document. The reading apparatus 90 is rotatably provided between such a state as to cover the top cover and the state in which the top cover is not covered as shown in FIG. 1.

A control portion C is a control device for performing various controls by controlling respective constituent elements of the image forming apparatus 1. As the control portion C, for example, a computer having computational resources such as a processor or a memory, a control circuit, or the like can be used. The control portion C operates a driving portion, an image forming portion, and the like, and performs a series of controls at the time of forming an image on the recording material P on the basis of the image data read by the reading apparatus 90, or the image data received from an external apparatus not shown for discharge. The control portion C may further detect the reduction of the amount of the toner, and may notify a user of the reduction thereof, and may urge the replenishment of the toner. For the toner amount detection, a given method such as optical detection or detection by weight measurement can be used. For the notification to a user, a given method such as voice or screen notification can be used.

Incidentally, FIGS. 1 to 3 show the system (direct replenishment system) in which a user replenishes a toner from the toner pack 100 filled with the toner for replenishment to the developing apparatus 30 with the developing apparatus 30 mounted in the image forming apparatus 1. This eliminates the necessity of the operation of extracting the process cartridge 20 from the apparatus main body 2, and replacing the process cartridge 20 with a new process cartridge when the toner remaining amount of the process cartridge 20 is reduced. For this reason, the usability is improved. Further, a toner can be replenished to the developer container 32 at a lower cost than that by replacing the whole process cartridge 20. Incidentally, the direct replenishment system does not require replacement of various rollers, gears, or the like as compared with the case where only the developing apparatus 30 of the process cartridge 20. For this reason, cost reduction can be achieved. However, the present invention is not limited to the direct replenishment system.

[Toner to be Accommodated to Toner Pack]

The toner for use in the present invention, in other words, the toner to be accommodated in the toner pack 100 will be described. In the present invention, the value of Total Energy is 300 mJ or less in measurement of the Total Energy at the time of causing a propeller type blade to penetrate the surface of the powder layer of the toner manufactured by applying a vertical load of 88 kPa in a measurement container in a powder flowability measurement device of the toner while being rotated at a peripheral speed of 100 mm/see of the outermost edge portion of the propeller type blade. This means as follows. The lower the Total Energy, the easier it is for the toner to be picked apart from the compacted state. Namely, the value indicates the compaction degree of the toner. A toner with a higher compaction degree is more susceptible to toner degradation when stored in the pack. For example, when the unevenness of the toner surface formed by an external additive tends to interlock between the toner particles, the value of Total Energy increases. In this case, it is considered that, starting from the site of interlocking due to application of a load, the toner degradation is promoted. The Total Energy can be controlled according to the shape of the toner and the kind, amount, and coverage of the external additive to be added.

The content of the silica particle (external additive) is preferably 1.4 mass % or more, and more preferably 2.0 mass % or more. The larger the content of the silica particle, the easier it is to reduce the Total Energy. A too large external additive amount deteriorates fixing, or deteriorates the member contamination of a printer. For this reason, the amount of the external additive is required to be appropriately adjusted.

The coverage of the toner particle surface by a silica particle is preferably at least 34% and not more than 80%. The coverage is more preferably at least 39% and not more than 75%. The higher the coverage is, the more the compaction degree of the toner is suppressed. Accordingly, the Total Energy becomes more likely to be reduced, or the resistance against the toner degradation at the time of receiving an external force becomes stronger. The coverage can be controlled according to the kind, the amount, and the external addition conditions of the silica particle.

A toner preferably includes a hydrotalcite particle containing fluorine. A toner more preferably includes fluorine in the inside of a hydrotalcite particle. Inclusion of negative fluorine in a positive hydrotalcite particle facilitates suppression of local overcharging of the toner. Herein, one of the causes of compaction is electrostatic agglomeration. However, by suppressing local overcharging of a toner as described above, the electrostatic agglomeration of the toner in the pack can be suppressed. For this reason, the compaction is improved. As a result, the degradation of the toner can be suppressed.

A toner includes a surfactant. The surfactant preferably has a P/N ratio that is the ratio of the positive components and the negative components of at least 0.1 and not more than 0.8. The P/N ratio is more preferably at least 0.2 and not more than 0.6. This facilitates suppression of local overcharging of the toner. This suppresses the compaction due to the electrostatic agglomeration of the toner in the pack described later, so that the toner degradation is suppressed. The P/N ratio can be controlled according to the kind and the amount ratio of the surfactant at the time of manufacturing the toner.

[Configuration of Toner Pack]

Figure 4B:
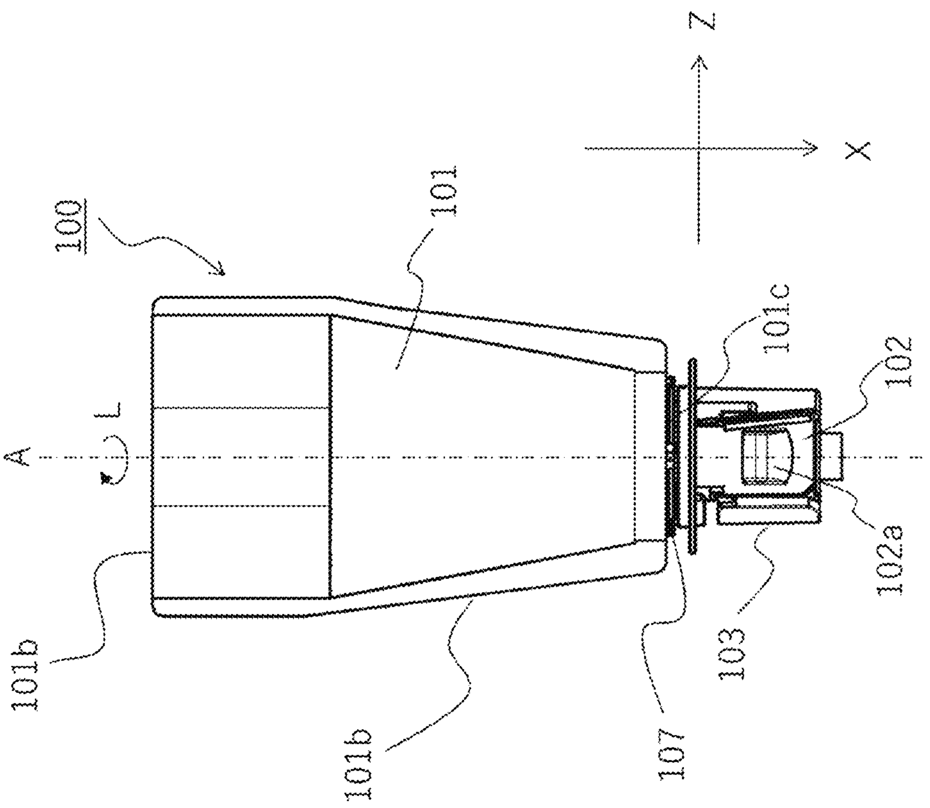
FIG. 4B is a schematic view of a toner pack in which a shutter assumes a second position.
Figure 4A:
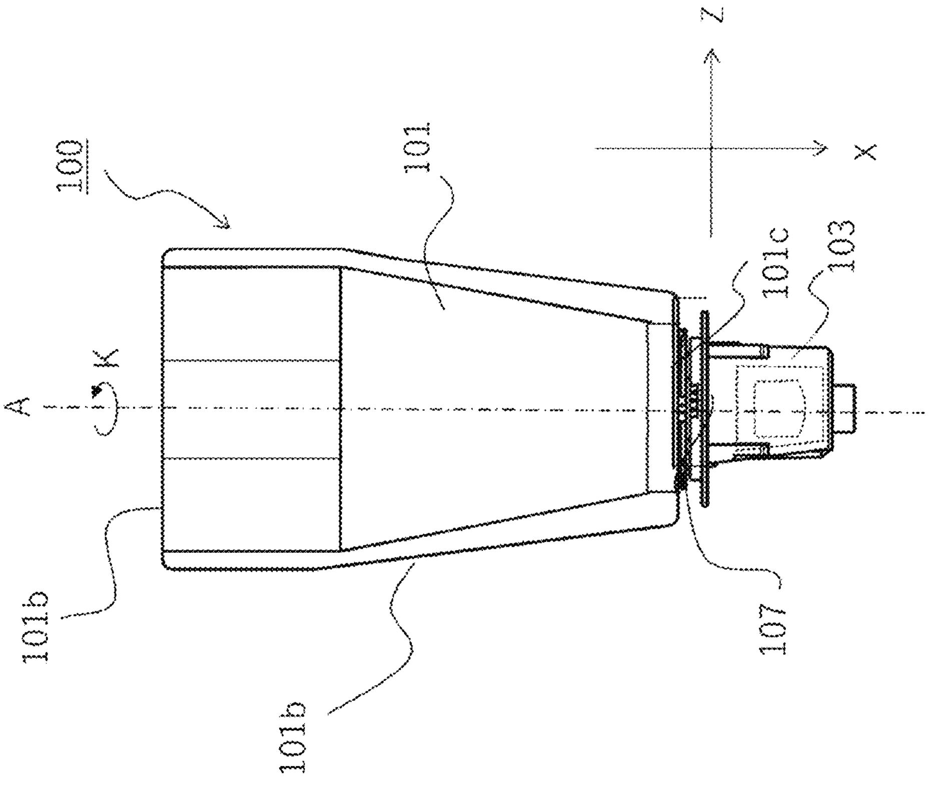
FIG. 4A is a schematic view of a toner pack in which a shutter assumes a first position.
Figure 5:
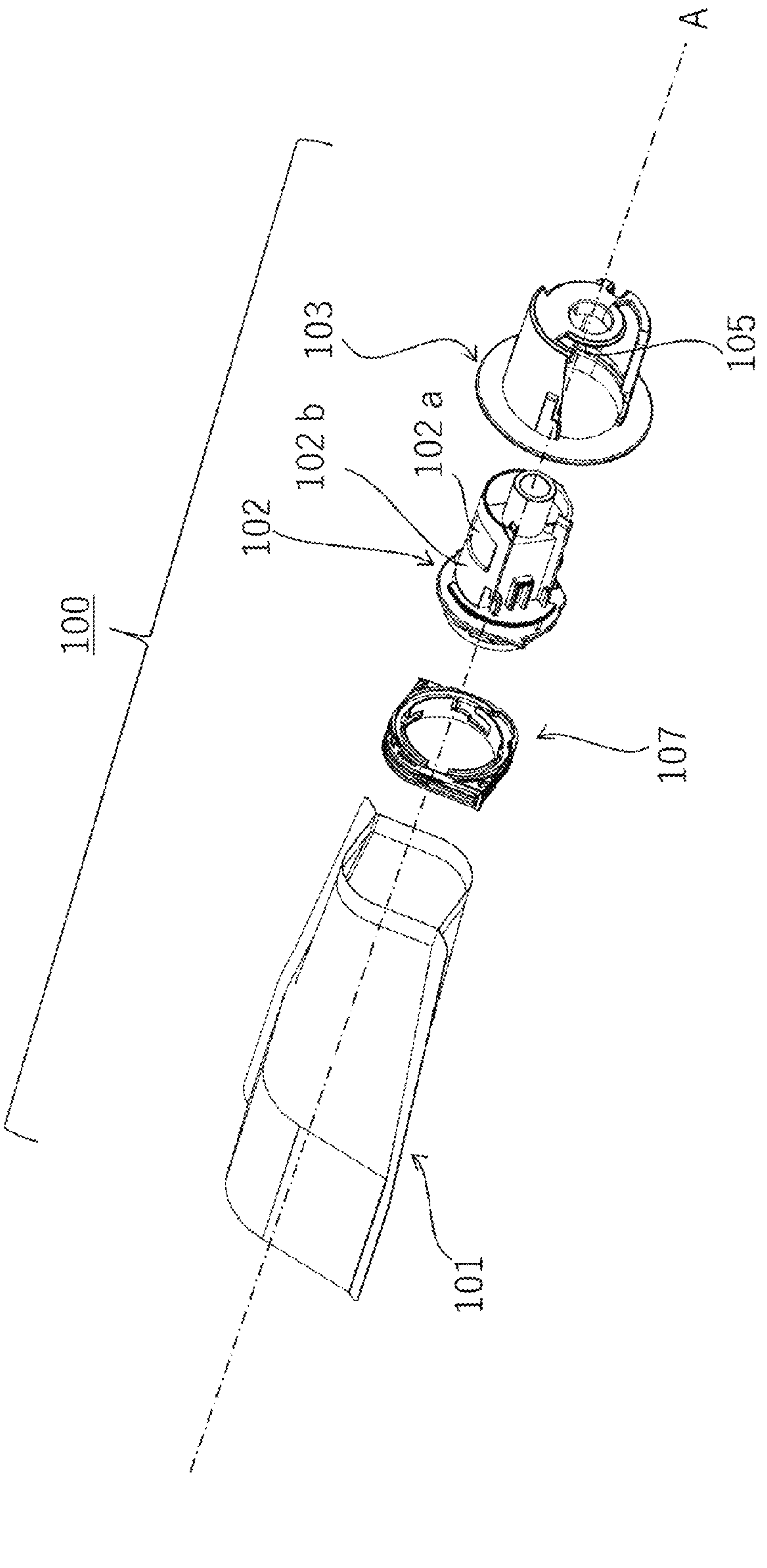
FIG. 5 is an exploded perspective view showing a configuration of a toner pack.

Then, referring to FIGS. 4 and 5, the configuration of a toner pack 100 will be described. FIG. 4 is a front view and a schematic cross sectional view of a toner accommodating container. FIG. 5 is an exploded perspective view showing the inside configuration of the toner pack 100.

As shown in FIGS. 4 and 5, in the toner pack 100, on one end side (side of a first end) in the direction of an axis A, an accommodating portion 101 for accommodating a toner in the inside thereof is provided. In the present invention, the accommodating portion 101 is a bag having flexibility. FIGS. 4 and 5 each show the one including a resin sheet formed by pouch processing.

On the other hand, on the other end side (side of a second end) of the toner pack 100, a nozzle (nozzle portion) 102 is provided. The nozzle 102 and the accommodating portion 101 are coupled with each other by a coupling portion 107. At the side surface (first outer surface or wall surface) 102*b* of the nozzle 102 extending in the axis A direction, a discharge port (opening or first opening) 102*a* communicating with the inside of the accommodating portion 101 and capable of discharging the toner accommodated in the accommodating portion 101 to the outside is provided. On the side (side of a second end) opposite to the side on which the accommodating portion 101 of the nozzle 102 is provided, a pack-side shutter 103 (rotating member) is rotatably attached around the axis A as the center.

At the pack-side shutter 103, a pack-side seal 105 in a generally rectangular shape is attached. The pack-side shutter 103 assumes a first position at which the pack-side seal 105 shields the discharge port 102*a* and a second position at which the pack-side seal 105 does not shield but opens the discharge port 102*a*. FIG. 4A shows the state in which the pack-side shutter 103 assumes the first position. FIG. 4B shows the state in which the pack-side shutter 103 assumes the second position. When the pack-side shutter 103 assuming the first position is rotated in the direction of an arrow K around the axis A as the center as shown in FIG. 4A, the pack-side shutter 103 reaches the second position shown in FIG. 4B. Conversely, when the pack-side shutter 103 is rotated in the direction of an arrow L from the second position, the pack-side shutter 103 reaches the first position. In the process of the operations, the pack-side shutter 103 rubs the side surface 102*b* of the nozzle 102 via the pack-side seal 105.

The toner pack 100 is demanded to be compact in consideration of the transport efficiency and the space efficiency for displaying a product. Then, in consideration of the replenishment efficiency, it is preferable that the inside of the compact toner pack 100 is filled with a large amount of toner. However, the following has become clear: an increase in filling amount makes the toner more likely to be compacted during storage, and more likely to be deteriorated. In light of this, a description will be given to the further optimum toner pack for suppressing the toner degradation for the toner including a hydrotalcite particle including fluorine as described above.

The accommodating portion 101 is formed of a material having flexibility that can be deformed by hands (fingers) of a user with ease. The toner pack is preferably such a pack as to have a degree of agglomeration of the discharged toner of 40% or less after shaking the toner accommodating container at an amplitude of 80 mm and at 150 times/min for 5 minutes. Setting at 40% or less suppresses the electrostatic agglomeration of the toner in the pack due to shaking at the time of manufacturing or at the time of transport, so that the toner degradation can be suppressed.

The accommodating portion preferably includes a resin sheet. Further, the resin sheet configuring the accommodating portion is preferably any of a polypropylene sheet, a polyethylene sheet, and a PET sheet. The materials have a triboelectric series close to that of the toner including a hydrotalcite particle including fluorine as described above. For this reason, such a pack as to result in a degree of agglomeration of 40% or less described above tends to be obtained.

The thickness of the resin sheet is preferably at least 25 μm and not more than 300 μm. A thickness of 25 μm or more can reduce the influence on the temperature and the humidity. A thickness of 300 μm or less makes the sheet more likely to be bent, which can suppress local application of an external force to the toner.

EXAMPLES

[Measurement Method of Toner Physical Properties]

Below, the method for measuring various physical properties of a toner will be described.

<Measurement Method of Total Energy (TE) Amount of Toner>

The TE in the present invention is measured using a powder flowability measurement device (powder rheometer FT-4 manufactured by Freeman Technology Co.; which will be hereinafter abbreviated as FT-4).

Specifically, the measurement is performed by the following operations. Incidentally, in all the operations, for the propeller type blade, a 23.5-mm-dia blade exclusively for measuring FT-4 is used. A rotation axis is present in the direction of the normal at the center of a blade sheet of 23.5 mm×6.5 mm. The blade sheet is twisted smoothly counterclockwise, in such a manner that both the outermost edge portions (the portions 12 mm from the rotation axis) are twisted by 70° and the portion 6 mm from the rotation axis is twisted by 35°. For the material, a material made of SUS is used.

For the container to be used, a container exclusively for measuring FT-4 [a split container (model No.: C4031) with a diameter of 25 mm and a volume of 25 ml, and a height from the container bottom surface to the split portion of about 51 mm; this will be hereinafter also referred to simply as a container] is used.

Further, for compression of the toner, a piston for compression test (24 mm in diameter, 20 mm in height, and lower part mesh lining) is used in place of the propeller type blade.

The procedure of the measurement is as follows.

(1) Compaction Operation of Sample

To the container exclusively for measuring FT-4, 17.5 g of a toner is added (which is the mass for a specific gravity of 1.1, for example, adjustment is performed so that the volume may become comparable according to the specific gravity, such as the addition of 23.9 g of toner when the specific gravity is 1.5). A compression piston exclusively for measuring FT-4 is mounted, and compaction is performed at 88 kPa for 30 seconds.

(2) Split Operation

The toner layer is scraped off at the split portion of the container exclusively for measuring FT-4, thereby removing the toner at the toner layer top, thereby to form a toner layer with the same volume (25 ml).

(3) Measurement Operation

TE represents the total sum of the rotation torque and the vertical load obtained when a propeller type blade is advanced to a position of 10 mm from the bottom surface of the toner powder layer by setting the peripheral speed of the blade (the peripheral speed of the outermost edge portion of the blade) at 100 mm/see counterclockwise with respect to the toner powder layer surface (in the direction of pushing the toner powder layer by the rotation of the blade), and setting the advance speed in the vertical direction to the toner powder layer at the speed such that the angle formed between the trajectory drawn by the outermost edge portion of the moving blade and the powder layer surface (hereinafter, "blade trajectory angle") may become 5 (deg).

<Measurement Method of Content of Silica Particle>

A wavelength dispersive X-ray fluorescence analysis device "Axios" (manufactured by PANalytical Co.) and included dedicated software for performing measurement conditions setting and measurement data analysis "SuperQ ver. 4.0F" (manufactured by PANalytical Co.) are used. Incidentally, Rh is used as the anode of the X-ray vessel. The measurement atmosphere is set as vacuum, the measurement diameter (collimator mask diameter) is set at 27 mm, and the measurement time is set at 10 seconds. Further, when a light element is measured, detection is performed with a proportional counter (PC), and when a heavy element is measured, detection is performed with a scintillation counter (SC).

As the measurement sample, a pellet manufactured in the following manner is used. 4 gram of toner is placed in a special-purpose aluminum ring for pressing, and is flattened out, which is pressurized under 20 MPa for 60 seconds using a pellet molding compressor "BRE-32" (manufactured by Maekawa Testing Machine MFG Co., Ltd.), thereby to be molded into a pellet with a thickness of 2 mm and a diameter of 39 mm.

A silica ($SiO_2$) fine powder is added so as to be in an amount of 0.5 part for every 100 parts of a resin particle not including silicon, and the resulting mixture is sufficiently mixed using a coffee mill. Similarly, silica fine powders are mixed so as to be in amounts of 5.0 parts and 10.0 parts, respectively, with a resin particle. The resulting mixtures are used as samples for calibration curves.

For each sample, a pellet of a sample for a calibration curve is manufactured in the foregoing manner using a pellet molding compressor. Thus, the counting rate of a Si-Kα ray (unit: cps) observed at a diffraction angle (2θ)=109.8° when PET is used for an analyzing crystal is measured. At this step, the accelerating voltage and current values of the X-ray generating device are set at 24 kV and 100 mA, respectively. A calibration curve of a linear function is obtained with the counting rate of the obtained X ray as the vertical axis and the $SiO_2$ addition amount in each sample for a calibration curve as the horizontal axis. Then, the toner to be analyzed is formed into a pellet in the foregoing manner using a pellet molding compressor, and the counting rate of the Si-Kα ray thereof is measured. Then, the value of the horizontal axis is read from the calibration curve, and the value is referred to as the content of the silica particle.

<Measurement Method of Coverage by Silica Particle>

The backscattered electron image of the surface of the toner particle was acquired by a scanning electron microscope (SEM). The device and the observation conditions of the SEM are as follows.

Device used: ULTRA PLUS manufactured by Carl Zeiss Microscopy Co., Ltd.

Accelerating voltage: 1.0 kV

WD: 2.0 mm

Aperture Size: 30.0 μm

Detection signal: EsB (energy selective backscattered electron)

EsB Grid: 800 V

Observation magnification: 50,000 times

Contrast: 63.0±5.0% (reference value)

Brightness: 38.0±5.0% (reference value)

Resolution: 1024×768

Pretreatment: toner particle is scattered to carbon tape (vacuum evaporation is not performed)

The accelerating voltage and EsB Grid of the present invention are set so as to attain the items such as acquisition of the structural information of the outermost surface of a toner particle, charge-up prevention of an undeposited sample, and selective detection of a backscattered electron with a high energy. For the observation visual field, the vicinity of the apex at which the curvature of the toner particle is minimized is selected.

The coverage is acquired by analyzing the backscattered electron image on the surface of the toner particle obtained with the method using image processing software Image J (developer Wayne Rashand). The procedure will be shown below.

First, from the Type of the Image menu, the backscattered electron image to be analyzed is converted to 8-bit. Then, from the Filters of the Process menu, the Median diameter is set at 2.0 pixels, thereby to reduce the image noise. After removing the observation conditions display portion displayed at the lower part of the backscattered electron image, the image center is estimated. Thus, using the Rectangle Tool of the tool bar, the region of 1.5 μm square from the image center of the backscattered electron image is selected.

Then, from the Adjust of the Image menu, the Threshold is selected, and the Apply is clicked, thereby obtaining a binarized image of the site covered with an outer shell and a missing site not covered.

Then, using the Straight Line of the tool bar, the scale bar in the observation conditions display portion displayed at the lower part of the backscattered electron image is selected. In that state, the Set Scale of the Analyze menu is selected. As a result, a new window is opened, and the pixel distance of the selected straight line is inputted in the Distance in Pixels field. The value (e.g., 100) of the scale bar is inputted in the Known Distance field of the window, and the unit (e.g., nm) of the scale bar is inputted in the Unit of Measurement field, and OK is clicked. As a result, scale setting is completed. Subsequently, the Histogram of the Analyze menu is selected, and the numerical value of the Count and the numerical value of the Mode of the opened window are read. Calculation is performed in the following manner.

$$\text{Coverage} = \text{Mode}/\text{Count} \times 100$$

The procedure is performed on 20 visual fields for the toner particle to be evaluated, and the arithmetic mean value thereof is adopted as the final coverage.

<Measurement Method and Identification Method of Each Element Ratio of Hydrotalcite Particle>

The measurement of each element ratio of a hydrotalcite particle is performed by EDS mapping measurement of a toner using a scanning transmission electron microscope (STEM). With the EDS mapping measurement, each pixel of the analysis area has spectrum data. By using a silicon drift detector having a large detection element area, it is possible to measure the EDS mapping with a high sensitivity.

By performing statistical analysis on the spectrum data of each pixel obtained by the EDS mapping measurement, it is possible to obtain main-component mapping resulting from extraction of pixels with similar spectra. This enables mapping with components identified.

Manufacturing of a sample for observation is performed in the following procedure.

A toner is weighed in an amount of 0.5 g, and is allowed to stand still under a load of 40 kN for 2 minutes using a Newton press by a cylindrical mold with a diameter of 8 mm, thereby manufacturing a cylindrical 0.8-mm-dia (φ) toner pellet with a diameter of 8 mm and a thickness of about 1 mm. A 200-nm-thick thin piece is manufactured from an ultramicrotome (Leica Co., FC7).

The STEM-EDS mapping analysis is performed with the following devices and under the following conditions.

[Devices]

Scanning transmission electron microscope; manufactured by JEOL Co., JEM-2800

EDS detector; manufactured by JEOL Co., JED-2300T dry SD100GV detector (detection element area: 100 $mm^2$)

EDS analyzer; manufactured by Thermo Fisher Scientific Co., NORAN System 7

[Conditions for STEM-EDS]

Accelerating voltage of STEM: 200 kV

Magnification: 20,000 times

Probe size 1 nm

STEM image size; 1024×1024 pixel (EDS mapping image at the same position is acquired.)

EDS mapping size; 256×256 pixel, Dwell Time; 30 μs, cumulative number; 100 frames The calculation of each element ratio in the hydrotalcite particle on the basis of multivariate analysis is determined in the following manner.

The STEM-EDS analysis device provides EDS mapping. Then, the collected spectra mapping data is subjected to multivariate analysis using the COMPASS (PCA) mode in the measurement command of the NORAN System 7, thereby extracting the main component map image.

At that step, the setting values are set as follows.

Kernel size: 3×3

Quantitative map setting: high (slow)

Filter fit type: high precision (slow)

At the same time, the area ratio occupying the EDS measurement visual field of each main component to be extracted is calculated by this operation. The quantitative analysis is carried on the resulting EDS spectrum included each main component mapping by the Cliff-Lorimer method.

The differentiation between the toner particle portion and the hydrotalcite particle is performed on the basis of the quantitative analysis results of the resulting STEM-EDS main component mapping. The particle can be identified as a hydrotalcite particle from the particle size and shape, the content of a polyvalent metal such as aluminum or magnesium, and the content ratio thereof.

Further, the presence of fluorine in the inside of the hydrotalcite particle is confirmed by the following means.

On the basis of the mapping data by the STEM-EDS mapping analysis obtained by the foregoing method, fluorine and aluminum of the hydrotalcite particle are analyzed. Specifically, EDS line analysis is performed in the normal direction with respect to the outer circumference of the hydrotalcite particle, thereby performing analysis of fluorine and aluminum present in the particle inside.

Figure 6A:
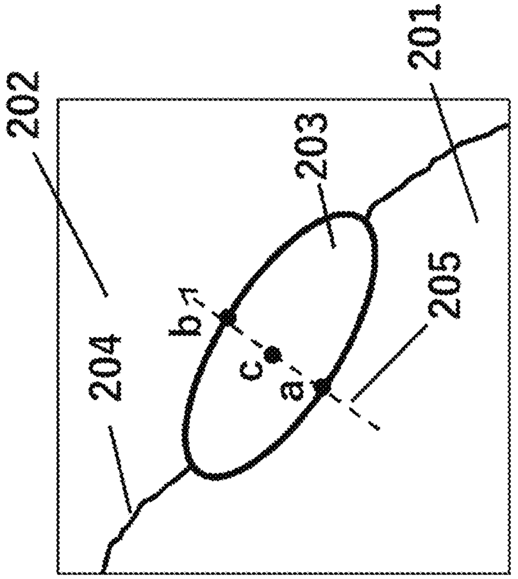
FIG. 6A is an explanatory view of line analysis in STEM-EDS mapping analysis.

FIG. 6A shows a schematic view of line analysis. Line analysis is performed in the normal direction with respect to the outer circumference of the hydrotalcite particle 203, namely, in the direction of a dotted line arrow of 205 in a toner particle 201, and a hydrotalcite particle 203 adjacent to a toner particle 202. Incidentally, 204 represents the boundary between toner particles.

The region in which the hydrotalcite particle in the acquired STEM image is present is selected by a rectangular selection tool, and line analysis is performed under the following conditions.

[Line Analysis Conditions]

STEM magnification; 800,000 times

Line length; 200 nm

Line width; 30 nm

Number of divisions of line; 100 points (intensity measured every 2 nm), or 50 points (every 4 nm)

When the element peak intensity of fluorine or aluminum is present 1.5 times or more the background intensity in the EDS spectrum of the hydrotalcite particle, and when the element peak intensities of fluorine or aluminum at both ends (a point a and a point b of FIG. 6A) of the hydrotalcite particle in line analysis each do not exceed 3.0 times the peak intensity at a point c, it is determined that the element is included in the inside of the hydrotalcite particle. Incidentally, the point c is assumed to be the midpoint of the line segment ab (i.e., the midpoint between both the ends).

Figure 6B:
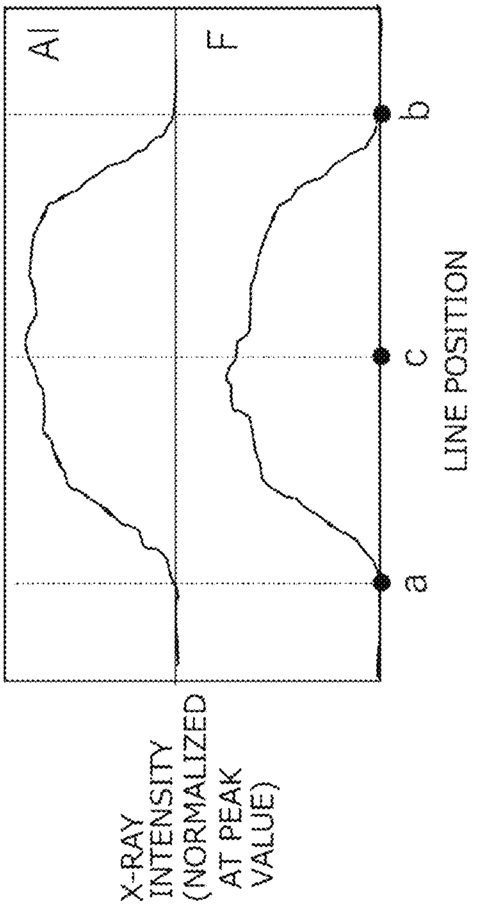
FIG. 6B is a view showing a shape of the X-ray intensity.
Figure 6C:
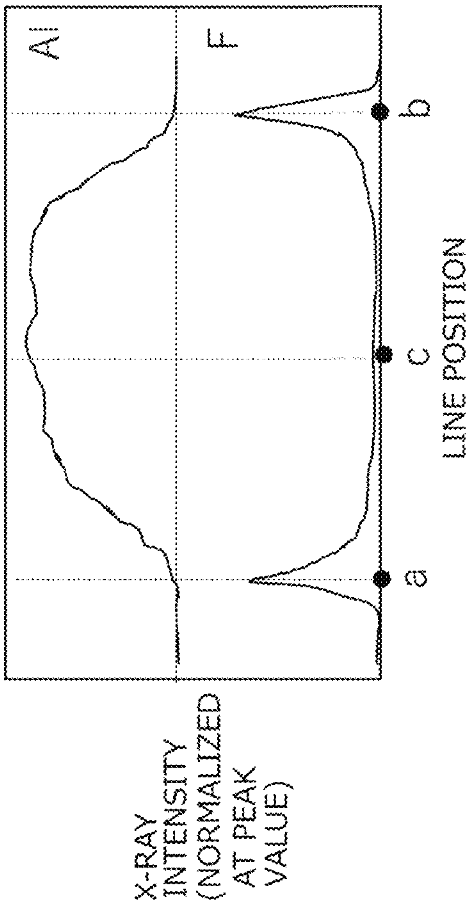
FIG. 6C is another view showing a shape of the X-ray intensity.

FIGS. 6B and 6C each show an example of the X-ray intensities of fluorine and aluminum obtained with line analysis. When the hydrotalcite particle includes fluorine and aluminum in the inside thereof, the graph of the X-ray intensity normalized by the peak intensity shows the shape as in FIG. 6B. When the hydrotalcite particle includes fluorine derived from a surface treatment agent, the graph of the X-ray intensity normalized by the peak intensity has peaks in the vicinity of the points a and b at both the ends in the graph of fluorine as shown in FIG. 6C. By confirming each X-ray intensity derived from fluorine and aluminum in line analysis, it is possible to confirm that the hydrotalcite particle includes fluorine in the inside thereof. It is determined that the element is included in the inside of the particle.

<Measurement Method of Shaking Agglomeration Degree>

The degree of agglomeration of the toner after shaking the toner pack is measured in the following manner.

The toner pack which has been previously allowed to stand still under 23° C. 60% RH environment for 24 hours, and then, subsequently has been shaken at an amplitude of 80 mm and at 150 times/min for 5 minutes is used. The following measurement is started in 10 minutes after shaking.

As the measurement device, the one obtained by connecting a digital display type vibrometer "DEGIVIBRO MODEL 1332A" (manufactured by Showa Sokki Corporation) to the shaking table side surface portion of a "PowderTester PTX model" (manufactured by HOSOKAWA MICRON CORPORATION) is used. Then, on the shaking table of the powder tester, a sieve with an opening of 20 μm (635 mesh), a sieve with an opening of 38 μm (390 mesh), and a sieve with an opening of 75 μm (200 mesh) are stacked and set sequentially from the bottom. The measurement is performed under 23° C. 60% RH environment in the following manner.

(1) The vibration width of the shaking table is previously adjusted so that the value of displacement of the digital display type vibrometer may become 0.60 mm (peak-to-peak).

(2) The toner after the shaking is weighed in an amount of 5.0 g, and is placed softly on the sieve at the uppermost stage with an opening of 75 μm.

(3) After shaking the sieve for 30 seconds, the mass of the toner left on each sieve is measured, and the degree of agglomeration is calculated on the basis of the following equation.

$$\text{Degree of agglomeration (\%)} = \{\text{mass of sample on sieve with an opening of } 75\ \mu\text{m (g))}/5\ \text{(g)}\}\times 100 + \{\text{mass of sample on sieve with an opening of } 38\ \mu\text{m (g))}/5\ \text{(g)}\}\times 100\times 0.6 + \{\text{mass of sample on sieve with an opening of } 20\ \mu\text{m (g))}/5\ \text{(g)}\}\times 100\times 0.2$$

(Measurement Method of P/N Ratio)

The measurement is performed in the following manner.

Toner is dissolved in an amount of 1 mg in 10 mL of methanol, and is allowed to stand still for 24 hours. Subsequently, the supernatant solution is collected and measured. When an undesired substance floats in the supernatant solution, if required, filtration is carried out by a device recommended filter.

Device: mass analysis device LCQ-Fleet (Thermo Fisher Scientific Co., Ltd.)

HPLC device Ultimate 3000 series (Thermo Fisher Scientific Co., Ltd.)

Measurement method: flow injection method (direct injection without column)

Eluant: methanol

Flow rate: 0.5 ml/min

Ionization method: ESI

Measurement region: 100-1500 m/z

In respective total ion chromatograms of ESI+ and ESI- obtained, the peak areas calculated by selecting from a retention time of from 0 minute to 5 minutes are referred to as P and N, respectively. The ratio P/N thereof is calculated.

<Measurement of Toner Particle Diameter>

The particle diameter of a toner is measured in the following manner. Using a precise particle size distribution measurement device by the pore electric resistance method including a 100-μm aperture tube "Coulter counter Multisizer 3" (registered tradename, manufactured by Beckman Coulter Co.), and included dedicated software "Beckman Coulter Multisizer 3 Version 3.51" (manufactured by Beckman Coulter Co.) for performing measurement conditions setting and measurement data analysis, measurement is performed at a number of effective measurement channels of 25000, and analysis of the measurement data is performed for calculation.

For the aqueous electrolytic solution to be used for the measurement, the one obtained by dissolving guaranteed sodium chloride in ion exchange water so as to have a concentration of about 1 mass %, for example, "ISOTON II" (manufactured by Beckman Coulter Co.) can be used.

Incidentally, before performing the measurement and analysis, setting of the dedicated software is performed in the following manner.

At the "Change screen of standard measurement method (SOM)" of the dedicated software, the total count number of the control mode is set at 50000 particles, the number of measurements is set at 1, and the Kd value is set at the value obtained using the "standard particle 10.0 μm" (manufactured by Beckman Coulter Co.). By pushing the measurement button of the threshold value/noise level, the threshold value and the noise level are automatically set. Further, the current is set at 1600 μA, the gain is set at 2, and the electrolytic solution is set at ISOTON II. The flush of the aperture tube after measurement is checked.

At the "conversion setting screen from pulse to particle diameter" of the dedicated software, the pin interval is set at the logarithm particle diameter, the particle diameter bin is set at 256 particle diameter bins, and the particle diameter range is set at at least 2 μm and not more than 60 μm.

The Specific measurement method is as follows.

(1) The aqueous electrolytic solution is charged in an amount of about 200 ml into a 250-ml round bottom beaker made of glass exclusively for Multisizer 3, and the beaker is set at a sample stand. Stirring of a stirrer rod is performed at 24 revolutions/second counterclockwise. Then, by the "flush of aperture tube" function of the dedicated software, the contamination and the bubbles in the aperture tube are removed.

(2) The aqueous electrolytic solution is charged in an amount of about 30 ml into a 100-ml flat bottom beaker made of glass, and a diluted solution prepared by diluting "Contaminon N" (a 10 mass % aqueous solution of a neutral detergent for washing a precision measuring instrument, including a nonionic surfactant, an anionic surfactant, and an organic builder and having a pH of 7, manufactured by Wako Pure Chemical Industries, Ltd.) to three mass fold with ion exchange water is added in an amount of about 0.3 ml therein as a dispersant.

(3) A predetermined amount of ion exchanged water is charged into the water tank of an ultrasonic dispersing unit "Ultrasonic Dispersion System Tetora 150" (manufactured by Nikkaki Bios Co., Ltd.) internally including two oscillators each having an oscillatory frequency of 50 kHz with the phase shifted by 180° and having an electrical output of 120 W. About 2 ml of the Contaminon N is added into the water tank.

(4) The beaker in the (2) is set in the beaker fixing hole of the ultrasonic dispersing unit, and the ultrasonic dispersing unit is operated. Then, the height position of the beaker is adjusted so as to maximize the resonance state of the liquid level of the aqueous electrolytic solution in the beaker.

(5) About 10 mg of the toner or toner particles are added in small amounts and dispersed in the aqueous electrolytic solution in the beaker of the (4) with the aqueous electrolytic solution in the beaker irradiated with an ultrasonic wave. Then, the ultrasonic dispersion treatment is continued for additional 60 seconds. Incidentally, the temperature of water in the water tank is appropriately adjusted so as to be at least 10° C. and not more than 40° C. for ultrasonic dispersion.

(6) The aqueous electrolytic solution of the (5) including a toner or a toner particle dispersed therein is added dropwise using a pipette to the round-bottom beaker of the (1) set in the sample stand, and the resulting mixture is adjusted so as to achieve a measurement concentration of about 5%. Then, the measurement is performed until the number of particles measured becomes 50,000.

(7) The measurement data is analyzed with the dedicated software included with the device, and the weight-average particle diameter is calculated, which is referred to as a toner particle diameter. Incidentally, the "average diameter" on the analysis/volume statistic value (arithmetic average) screen when the dedicated software is set to show data in graph/vol % is the weight-average particle diameter.

<Measurement Method of BET Specific Surface Area of Toner>

The measurement of the BET specific surface area (BETA) of the toner was performed according to JIS Z8830 (2001). The specific measurement method is as follows.

As the measurement device, the "automatic specific surface area • pore distribution measurement device TriStar 3000 (manufactured by SHIMADZU Corporation)" adopting the gas adsorption method by the isovolumetric method as the measurement system was used.

Setting of the measurement conditions and analysis of the measurement data were performed using the dedicated software "TriSTar 3000 Version 4.00" included with the present device. Further, a vacuum pump, a nitrogen gas pipe, and a helium gas pipe were connected with the device. A nitrogen gas was used as the adsorption gas, and the value calculated according to the BET multipoint method was referred to as the BET specific surface area in the present invention.

The BET specific surface area is calculated specifically in the following manner.

First, a toner is caused to adsorb a nitrogen gas. The equilibrium pressure P (Pa) in the sample cell at that step and the nitrogen adsorption amount Va ($mol \cdot g^{-1}$) of the toner are measured. Then, an adsorption isotherm with the relative pressure Pr that is the value obtained by dividing the equilibrium pressure P (Pa) in the sample cell by the saturated vapor pressure Po (Pa) of nitrogen as the horizontal axis, and the nitrogen adsorption amount Va ($mol \cdot g^{-1}$) as the vertical axis is obtained. Then, the monomolecular layer adsorption amount Vm ($mol \cdot g^{-1}$) that is the necessary adsorption amount for forming a monomolecular layer on the surface of the toner is determined by applying the following BET equation.

$$Pr/Va(1-Pr)=1/(Vm\times C)+(C-1)\times Pr/(Vm\times C)$$

(herein, C is the BET parameter, and is a variable varying according to the measurement sample species, the adsorption gas species, and the adsorption temperature).

The BET equation can be interpreted as a straight line with a slope of (C−1)/(Vm×C) and an intercept of 1/(Vm×C), where x-axis is Pr and y-axis is Pr/Va (1−Pr) (this straight line is referred to as a BET plot).

$$S = Vm\times N\times 0.162\times 10^{-18}$$

The actual measurement value of Pr and the actual measurement value of Pr/Va(1−Pr) are plotted on the graph, and a straight line is drawn by the least squares method. As a result, the values of the slope and the intercept of the straight line can be calculated. Using the values, the simultaneous equations of the slope and the intercept are solved. As a result, Vm and C can be calculated.

Further, from the Vm calculated as described above, and the molecular cross-sectional area (0.162 $nm^2$) of a nitrogen atom, the BET specific surface area S ($m^2 \cdot g^{-1}$) of the toner is calculated on the basis of the following equation.

$$\text{Slope of straight line} = (C-1)/(Vm\times C)$$

$$\text{Intercept of straight line} = 1/(Vm\times C)$$

(herein, N is the Avogadro's number ($mol^{-1}$)).

The measurement using the present device follows the "TriStar 3000 instruction manual V 4.0" included with the device. Specifically, the measurement is performed in the following procedure.

The tare of a special-purpose sample cell made of glass (3/8 inch in stem diameter, 5 ml in volume) sufficiently washed and dried is weighed. Then, using a funnel, 1.0 g of toner is charged into the sample cell.

The sample cell including the toner charged therein is set in a "pretreatment device VACPREP 061 (manufactured by SHIMADZU CORPORATION)" connected with a vacuum pump and a nitrogen gas pipe, and vacuum deaeration is continuously performed at 23° C. for about 10 hours. Incidentally, for vacuum deaeration, deaeration is gradually performed while adjusting the valve so as to prevent the toner from being sucked by a vacuum pump. The pressure in the cell gradually decreases with deaeration, and finally becomes about 0.4 Pa (about 3 millimeter). After completion of vacuum deaeration, a nitrogen gas is gradually injected thereinto, thereby to return the inside of the sample cell to the atmospheric pressure, and the sample cell is removed from the pretreatment device. Then, the mass of the sample cell is weighed, and the precise mass of the toner is calculated from the difference from that of the tare. Incidentally, at this step, the sample cell is covered with a rubber stopper during weighing so as to prevent the toner in the sample cell from being contaminated with the moisture in the air, and the like.

Then, a dedicated "isothermal jacket" is attached to the stem portion of the sample cell including the toner therein. Then, a dedicated filler rod is inserted into the sample cell, and the sample cell is set at the analysis port of the device.

Incidentally, the isothermal jacket is a tubular member with the inner surface including a porous material and the outer surface including an impermeable material, capable of sucking up liquid nitrogen to a given level by the capillarity.

Subsequently, the measurement of the free space of the sample cell including a connecting tool is performed. The free space is calculated by conversion from the difference between the following volumes: the volume of the sample cell is measured using a helium gas at 23° C.; and subsequently, the volume of the sample cell after cooling the sample cell with liquid nitrogen is similarly measured using a helium gas. Further, the saturated vapor pressure Po (Pa) of nitrogen is separately automatically measured using a Po tube included in the device.

Then, after performing vacuum deaeration in the sample cell, the sample cell is cooled with liquid nitrogen while continuously performing vacuum deaeration. Thereafter, a nitrogen gas is introduced into the sample cell step by step, so that a nitrogen molecule is adsorbed by the toner. At this step, by measuring the equilibrium pressure P (Pa) if required, it is possible to obtain the adsorption isotherm. For this reason, the adsorption isotherm is converted to BET plots. Incidentally, the points of the relative pressure Pr for collecting data are set at a total of 6 points of 0.05, 0.10, 0.15, 0.20, 0.25, and 0.30. A straight line is drawn with respect to the obtained measurement data by the least square method, and Vm is calculated from the slope and the intercept of the straight line. Further, using the value of Vm, the BET specific surface area of the toner is calculated in the foregoing manner.

[Evaluation of Toner Degradation Degree During Storage]

As described below, the degrees of toner degradation during storage with/without a load are measure, thereby evaluating the toner accommodating container.

A toner pack is allowed to stand still under environment of a temperature of 45° C. and a humidity of 90% RH for 5 days. Subsequently, the toner pack is allowed to stand still under environment of a temperature of 23° C. and a humidity of 60% RH for 24 hours, and the toner is taken out from the pack. Thus, whether blocking has occurred or not is confirmed. Then, as for the toner whose blocking is not observed, the BET specific surface areas of the toner before and after standing still under the environment are measured, and the BET retention ratio is calculated from the following equation. Thus, the toner degradation degree without a load is evaluated. The change in value of the BET specific surface area is an indicator mainly indicative of the embedding in the toner particle surface of a silica particle. When a silica particle is embedded in the toner particle surface, the flowability and the chargeability of the toner may change, so that there is a possibility that a desirable value suitable for image formation cannot be obtained. Further, herein, when an agglomerated toner is present in at least a part of the toner pack, it is determined that blocking has occurred. The inspection of whether blocking has occurred or not can be carried out by, for example, visual observation, or manipulation using hands and fingers.

$$BET \text{ retention ratio } (\%) = BET \text{ specific surface area before standing still}/BET \text{ surface area after standing still} \times 100$$

The toner degradation degree with a load is evaluated under the same conditions except for applying a toner with a load of 18 g/cm$^2$. How to apply a load is appropriately adjusted according to the size of the pack so that a load is applied evenly to the whole toner accommodating portion. Specifically, a slightly larger sheet than the toner accommodating portion is prepared, and is placed on the toner accommodating portion, and a weight is placed on the sheet. At that step, the load applied to the toner is calculated by the following equation. The weight of the weight is adjusted so that the value may become 18 g/cm$^2$.

Load Applied to Toner=Total Weights of Weight and Sheet/Contact Area

Example 1

(Manufacturing of Toner 1)

<Manufacturing of Toner Particle 1>

For every 100 parts by mass of a styrene monomer, 16.5 parts by mass of carbon black (Nipex 35), and 3.0 parts by mass of an aluminum compound of di-tert-butylsalicyclic acid [BONTRON E88 (manufactured by Orient Chemical Industries Co., Ltd.)] were prepared. These were introduced into an attritor (manufactured by Mitsui Mining Co., Ltd). Stirring was performed at 200 rpm at 25° C. for 180 minutes using zirconia beads (140 parts by mass) with a radius of 1.25 mm, thereby preparing a master batch dispersed solution.

On the other hand, 450 parts by mass of a 0.1 M-$Na_3PO_4$ aqueous solution was charged into 710 parts by mass of ion exchange water, and the resulting mixture was heated to 60° C. Then, 67.7 parts by mass of 1.0 M-$CaCl_2$) aqueous solution was gradually added thereto, resulting in an aqueous medium including a calcium phosphate compound.

Master batch dispersed solution: 40 parts by mass

Styrene: 49.5 parts by mass n-butyl acrylate: 16.5 parts by mass

Hydrocarbon type wax: 9 parts by mass (Fischer-Tropsch wax, peak temperature of maximum endothermic peak=78° C., Mw=750)

Saturated polyester resin: 5.0 parts by mass

The materials were heated to 65° C., and was uniformly dissolved and dispersed at 5,000 rpm using a T.K. homomixer (manufactured by PRIMIX Corporation). Thereinto, 7.1 parts by mass of a 70% toluene solution of a polymerization initiator 1,1,3,3-tetramethylbutyleperoxy2-ethyl hexanoate was dissolved, thereby preparing a polymerizable monomer composition.

The polymerizable monomer composition was charged into the aqueous medium, and stirring was performed at 12,000 rpm for 10 minutes by a T.K. homomixer at a temperature of 65° C. under a $N_2$ atmosphere, thereby granulating a polymerizable monomer composition. Thereafter, when with stirring by a paddle stirring blade, the temperature was increased to 67° C., and the polymerization conversion ratio of the polymerizable vinyl type monomer reached 90%, a 0.1 mol/l aqueous sodium hydroxide solution was added, thereby adjusting the pH of the aqueous dispersion medium to 9. Further, the temperature was increased to 80° C. at a ramp rate of 40° C./h, thereby effecting the reaction for 4 hours. After the completion of the polymerization reaction, the residual monomers in the toner particle was distilled off under reduced pressure. After cooling the aqueous medium, hydrochloric acid was added to a pH of 1.4, and stirring was performed for 6 hours, thereby dissolving a calcium phosphate salt. The toner particle was filtered out, and water washing was performed. Then, drying was performed at a temperature of 40° C. for 48 hours. The obtained dried product was subjected to simultaneous strict classification and removal of an ultrafine powder and a coarse powder by a multi-division classification device (Elbow jet classifier manufactured by Nittetsu Mining Co.), resulting in a toner particle 1 with a particle diameter of 6.0 μm.

<Manufacturing of Toner 1>

A toner particle 1 (100 parts by mass) and a silica particle RX300 (manufactured by Japan Aerogel Co.) (1.4 parts by mass) were dry mixed under the condition of 3600 rpm for 12 minutes by a Henschel mixer FM10C (manufactured by Mitsui Mining Co., Ltd), resulting in a toner 1. The physical properties are shown in Table 1.

TABLE 1

| Toner | Particle diameter (μm) | Silica particle amount (mass %) | Silica particle coverage (%) | TE (mJ) | P/N |
|---|---|---|---|---|---|
| Toner 1 | 6.0 | 1.4 | 36 | 300 | — |
| Toner 2 | 7.5 | 2.2 | 42 | 200 | — |
| Toner 3 | 6.5 | 2.0 | 48 | 180 | — |
| Toner 4 | 7.5 | 2.0 | 66 | 130 | — |
| Toner 5 | 7.5 | 1.5 | 43 | 120 | 0.4 |
| Toner 6 | 7.5 | 1.5 | 43 | 135 | 0.1 |
| Toner 7 | 7.5 | 1.5 | 43 | 120 | 0.2 |
| Toner 8 | 7.5 | 1.5 | 43 | 130 | 0.6 |
| Toner 9 | 7.5 | 1.5 | 43 | 135 | 0.8 |
| Toner 10 | 6.5 | 3.2 | 80 | 200 | — |
| Toner 11 | 9.6 | 1.5 | 38 | 350 | — |
| Toner 12 | 8.9 | 1.1 | 55 | 300 | — |

Manufacturing Example of Toner Accommodating Container 1

For the toner accommodating container of FIGS. 4 and 5, manufacturing was performed using each toner accommodating portion 1 described in Table 2, and the toner 1 was filled so that the filling ratio (the ratio of the volume of the filling toner to the maximum space volume of the toner accommodating portion) may become 0.7, and the discharge port was closed, resulting in a toner accommodating container 1.

TABLE 2

| Toner accommodating portion | Material | Sheet thickness (mm) |
|---|---|---|
| Accommodating portion 1 | PP | 115 |
| Accommodating portion 2 | PE | 115 |
| Accommodating portion 3 | PET | 115 |
| Accommodating portion 4 | PP | 25 |
| Accommodating portion 5 | PP | 300 |

(Evaluation of Toner Accommodating Container 1)

The toner degradation degree was evaluated with respect to the obtained toner accommodating container 1.

<Evaluation Criteria>

A: No blocking, and BET retention ratio of 90% or more

B: No blocking, and BET retention ratio of 80% or more

C: No blocking, and BET retention ratio of 70% or more

D: blocking occurred, or BET retention ratio of less than 70%

With the present evaluation, C or more was determined as a practical level. The results of evaluation are shown in Table 3.

TABLE 3

| Example | Developer accommodating container | Toner | Toner accommodating portion | Degree of agglomeration | Toner degradation evaluation (without load) | Toner degradation evaluation (with load) |
|---|---|---|---|---|---|---|
| Example 1 | Container 1 | Toner 1 | Accommodating portion 1 | 50 | C 78% | C 71% |
| Example 2 | Container 2 | Toner 2 | Accommodating portion 1 | 21 | A 92% | A 90% |
| Example 3 | Container 3 | Toner 3 | Accommodating portion 1 | 40 | A 90% | C 74% |
| Example 4 | Container 4 | Toner 4 | Accommodating portion 1 | 20 | A 93% | A 90% |
| Example 5 | Container 5 | Toner 5 | Accommodating portion 1 | 30 | A 91% | B 87% |
| Example 6 | Container 6 | Toner 6 | Accommodating portion 1 | 40 | A 90% | C 78% |
| Example 7 | Container 7 | Toner 7 | Accommodating portion 1 | 35 | A 91% | B 82% |
| Example 8 | Container 8 | Toner 8 | Accommodating portion 1 | 35 | A 91% | B 83% |
| Example 9 | Container 9 | Toner 9 | Accommodating portion 1 | 40 | A 90% | C 76% |

TABLE 3-continued

| Example | Developer accommo-dating container | Toner | Toner accommo-dating portion | Degree of agglo-meration | Toner degradation evaluation (without load) | Toner degradation evaluation (with load) |
|---|---|---|---|---|---|---|
| Example 10 | Container 10 | Toner 10 | Accommo-dating portion 2 | 21 | A 91% | A 90% |
| Example 11 | Container 11 | Toner 2 | Accommo-dating portion 3 | 21 | A 92% | A 90% |
| Example 12 | Container 12 | Toner 2 | Accommo-dating portion 4 | 21 | B 87% | B 84% |
| Example 13 | Container 13 | Toner 2 | Accommo-dating portion 5 | 21 | A 93% | B 89% |
| Example 14 | Container 15 | Toner 12 | Accommo-dating portion 1 | 52 | A 90% | B 85% |
| Comparative Example | Container 14 | Toner 11 | Accommo-dating portion 1 | 58 | D (Blocking) | D (Blocking) |

Example 2

(Manufacturing of Toner 2)

(Preparation of Binder Resin Particle Dispersed Solution)

Styrene in an amount of 89.5 parts. 9.2 parts of butyl acrylate. 1.3 parts of acrylic acid, and 3.2 parts of n-lauryl-mercaptan were mixed and dissolved. To the solution, an aqueous solution obtained by mixing 1.5 parts of NEOGEN RK (manufactured by Daiichi Kogyo Co., Ltd.) in 150 parts of ion exchange water was added, and dispersed.

Further, with stirring slowly for 10 minutes, an aqueous solution obtained by mixing 0.3 part of potassium persulfate in 10 parts of ion exchange water was added.

After nitrogen replacement, emulsion polymerization was performed at 70° C. for 6 hours. After completion of the polymerization, the reaction solution was cooled to room temperature, and ion exchange water was added, resulting in a binder resin particle dispersed solution with a solid content concentration of 12.5 mass % and a volume-based median diameter of 0.2 μm.

<Preparation of Mold Release Agent>

One hundred parts of a mold release agent (behenyl behenate, melting point: 72.1° C.) and 15 parts of NEOGEN RK were mixed with 385 parts of ion exchange water, and were dispersed using a wet jet mill JN100 (manufactured by JOKOH Co., Ltd.) for about 1 hour, resulting in a mold release agent dispersed solution. The solid content concentration of the mold release agent dispersed solution was 20 mass %.

<Preparation of Colorant Dispersed Solution>

One hundred parts of carbon black (Nipex 35) and 15 parts of NEOGEN RK were mixed with 885 parts of ion exchange water, and were dispersed using a wet jet mill JN100 for about 1 hour, resulting in a colorant dispersed solution.

<Preparation of Toner Particle 2>

A binder resin particle dispersed solution in an amount of 265 parts, 10 parts of a mold release agent, and 10 parts of a colorant dispersed solution were charged in a container, and were dispersed using a homogenizer (manufactured by IKA Co.: Ultratalax T50).

With stirring, the temperature in the container was adjusted to 30° C., and a 1-mol/L aqueous sodium hydroxide solution was added thereto, resulting in adjustment to pH=8.0.

As a flocculant, an aqueous solution obtained by dissolving 0.25 part of aluminum chloride in 10.0 parts of ion exchange water was added with stirring at 30° C. over 10 minutes. After standing still for 3 minutes, the temperature raising was started, and the temperature was raised to 50° C., thereby performing formation of an aggregated particle. At the time point when the weight average particle diameter (D4) became 6.0 μm, 0.90 part of sodium chloride and 5.0 parts of NEOGEN RK were added, thereby stopping the particle growth.

A 1-mol/L aqueous sodium hydroxide solution was added, resulting in adjustment to pH=9.0. Then, the temperature was raised to 95° C., and spheroidization of the aggregated particle was performed. When the average circularity reached 0.960, the temperature lowering was started, and cooling was performed to 30° C., resulting in a toner particle dispersed solution.

To the obtained toner particle dispersed solution, hydrochloric acid was added, resulting in adjustment to pH=1.5 or less. The mixture was left under stirring for 1 hour, and then, was subjected to solid/liquid separation by a pressure filter, resulting in a toner cake.

This was made into a slurry with ion exchange water again, resulting in a dispersed solution, followed by solid/liquid separation by the filter. Reslurry and solid/liquid separation were repeated until the electric conductivity of the filtrate became 5.0 μS/cm or less. Then, finally, solid/liquid separation was performed, resulting in a toner cake.

The resulting toner cake was dried by an air-current dryer flash jet dryer (manufactured by SEISHIN ENTERPRISE Co., Ltd.). The conditions for drying were set at a blowing temperature of 90° C., the dryer outlet temperature of 40° C., and the supply speed of the toner cake was adjusted to a speed such that the outlet temperature did not deviate from 40° C. according to the moisture content of the toner cake. Further, using a multi-division classifier using the Coanda effect, fine and coarse powders were cut, resulting in a toner particle 2. The particle diameter of the toner particle 2 was 7.5 μm.

<Manufacturing of Fluorine-Containing Hydrotalcite Particle>

A mixed aqueous solution (solution A) of 1.03-mol/L magnesium chloride and 0.239-mol/L aluminum sulfate, a 0.753-mol/L aqueous sodium carbonate solution (solution B), and a 3.39-mol/L aqueous sodium hydroxide solution (solution C) were prepared.

Then, a solution A, a solution B, and a solution C were added into a reaction vessel at a such flow rate as to provide a volume ratio of solution A: solution B of 4.5:1 using a metering pump. The pH value of the reaction solution was held within the range of 9.3 to 9.6 with the solution C. Thus, the reaction was effected at a reaction temperature of 40° C., thereby generating a precipitate. After filtration and washing, reemulsion was caused in ion exchange water, resulting in a hydrotalcite slurry of the raw materials. The hydrotalcite in the obtained hydrotalcite slurry had a concentration of 5.6 mass %. The resulting hydrotalcite slurry was vacuum dried at 40° C. overnight. NaF was dissolved in ion exchange water so as to achieve a concentration of 100 mg/L, and the one with a pH adjusted to 7.0 was formed using 1-mol/L HCl or 1-mol/L NaOH, and the dried hydrotalcite was added so as to achieve 0.1% (w/v %). Using a magnetic stirrer, constant speed stirring was performed for 48 hours to such a degree as to prevent precipitation. Subsequently, filtration was performed with a membrane filter with a pore diameter of 0.5 μm, and washing was performed with ion exchange water. The resulting hydrotalcite was vacuum dried at 40° C. overnight, and subsequently, a deagglomeration treatment was performed. Line analysis in STEM-EDS mapping analysis was carried out on the resulting fluorine-containing hydrotalcite particle. As a result, fluorine was present in the inside thereof.

<Manufacturing of Toner 2>

To the resulting toner particle 2 (100 parts), a fluorine-containing hydrotalcite particle (0.3 part), and a silica particle RX300 (2.2 parts by mass) were dry mixed under the condition of 3600 rpm for 12 minutes by a Henschel mixer FM10C (manufactured by Mitsui Mining Co., Ltd.), resulting in a toner 2. The physical properties are shown in Table 1.

(Manufacturing of Toner Accommodating Container 2)

Using each toner, and each toner accommodating container described in Tables 2 and 3, a toner accommodating container 2 was obtained in the same manner as with the toner accommodating container 1.

(Evaluation of Toner Accommodating Container 2)

The resulting toner accommodating container 2 was evaluated on the toner degradation degree. The results are shown in Table 3.

Example 3

(Manufacturing of Toner 3)

A toner 3 was obtained in the same manner as with the (Manufacturing of toner 1), except for changing RX 300 (1.4 parts by mass) to RX 300 (2.0 parts by mass) in the <Manufacturing of toner 1>. The physical properties are shown in Table 1.

(Manufacturing of Toner Accommodating Container 3)

Using each toner, and each toner accommodating container described in Tables 2 and 3, a toner accommodating container 3 was obtained in the same manner as with the toner accommodating container 1.

(Evaluation of Toner Accommodating Container 3)

The resulting toner accommodating container 3 was evaluated on the toner degradation degree. The results are shown in Table 3.

Example 4

(Manufacturing of Toner 4)

A toner 4 was obtained in the same manner as with the (Manufacturing of toner 2), except for performing the spheroidization step until the average circularity might become 0.990 in the <Preparation of toner particle 2>, and changing RX 300 (2.2 parts by mass) to RX 300 (2.0 parts by mass) in the <Manufacturing of toner 2>. The physical properties are shown in Table 1.

(Manufacturing of Toner Accommodating Container 4)

Using each toner, and each toner accommodating container described in Tables 2 and 3, a toner accommodating container 4 was obtained in the same manner as with the toner accommodating container 1.

(Evaluation of Toner Accommodating Container 4)

The resulting toner accommodating container 4 was evaluated on the toner degradation degree. The results are shown in Table 3.

Example 5

(Manufacturing of Toner 5)

<Preparation of Binder Rein Particle Dispersed Solution>

Styrene in an amount of 89.5 parts, 9.2 parts of butyl acrylate, 1.3 parts of acrylic acid, and 3.2 parts of n-laurylmercaptan were mixed and dissolved. To the solution, an aqueous solution obtained by mixing 1.5 parts of NEOGEN RK (manufactured by Daiichi Kogyo Co., Ltd.) and 3.0 parts of ethylene glycol type surfactant in 150 parts of ion exchange water was added, and dispersed.

Further, with stirring slowly for 10 minutes, an aqueous solution obtained by mixing 0.3 part of potassium persulfate in 10 parts of ion exchange water was added.

After nitrogen replacement, emulsion polymerization was performed at 70° C. for 6 hours. After completion of the polymerization, the reaction solution was cooled to room temperature, and ion exchange water was added, resulting in a binder resin particle dispersed solution with a solid content concentration of 12.5 mass % and a volume-based median diameter of 0.2 μm.

<Preparation of Mold Release Agent>

One hundred parts of a mold release agent (Fischer Tropsch Wax, peak temperature of maximum endothermic peak=78° C., Mw=750) and 15 parts of NEOGEN RK were mixed with 385 parts of ion exchange water, and were dispersed using a wet jet mill JN100 (manufactured by JOKOH Co., Ltd.) for about 1 hour, resulting in a mold release agent dispersed solution. The solid content concentration of the mold release agent dispersed solution was 20 mass %.

<Preparation of Colorant Dispersed Solution>

One hundred parts of carbon black (Nipex 35) and 15 parts of NEOGEN RK were mixed with 885 parts of ion exchange water, and were dispersed using a wet jet mill JN100 for about 1 hour, resulting in a colorant dispersed solution.

<Preparation of Toner Particle 5>

A binder resin particle dispersed solution in an amount of 265 parts, 10 parts of a mold release agent, and 10 parts of a colorant dispersed solution were charged in a container, and were dispersed using a homogenizer (manufactured by IKA Co.: Ultratalax T50).

With stirring, the temperature in the container was adjusted to 30° C., and a 1-mol/L aqueous sodium hydroxide solution was added thereto, resulting in adjustment to pH=8.0.

As a flocculant, an aqueous solution obtained by dissolving 0.25 part of aluminum chloride in 10.0 parts of ion exchange water was added with stirring at 30° C. over 10 minutes. After standing still for 3 minutes, the temperature raising was started, and the temperature was raised to 50° C., thereby performing formation of an aggregated particle. At the time point when the weight average particle diameter (D4) became 7.0 μm, 0.90 part of sodium chloride and 5.0 parts of NEOGEN RK were added, thereby stopping the particle growth.

A 1-mol/L aqueous sodium hydroxide solution was added, resulting in adjustment to pH=9.0. Then, the temperature was raised to 95° C., and spheroidization of the aggregated particle was performed. When the average circularity reached 0.960, the temperature lowering was started, and cooling was performed to 30° C., resulting in a toner particle dispersed solution.

To the obtained toner particle dispersed solution, hydrochloric acid was added, resulting in adjustment to pH=1.5 or less. The mixture was left under stirring for 1 hour, and then, was subjected to solid/liquid separation by a pressure filter, resulting in a toner cake.

This was subjected to reslurry with ion exchange water, again resulting in a dispersed solution, followed by solid/liquid separation by the filter. Reslurry and solid/liquid separation were repeated until the electric conductivity of the filtrate became 5.0 μS/cm or less. Then, finally, solid/liquid separation was performed, resulting in a toner cake.

The resulting toner cake was dried by an air-current dryer flash jet dryer (manufactured by SEISHIN ENTERPRISE Co., Ltd.). The conditions for drying were set at a temperature of 90° C., and at a dryer outlet temperature of 40° C., and the supply speed of the toner cake was adjusted to a speed such that the outlet temperature did not deviate from 40° C. according to the moisture content of the toner cake. Further, using a multi-division classifier using the Coanda effect, fine and coarse powders were cut, resulting in a toner particle 5. The particle diameter of the toner particle 5 was 7.5 μm.

<Manufacturing of Toner 5>

A toner particle 5 (100 parts by mass) and a silica particle RX300 (manufactured by Japan Aerogel Co.) (1.5 parts by mass) were dry mixed under the condition of 3600 rpm for 12 minutes by a Henschel mixer FM10C (manufactured by Mitsui Mining Co., Ltd), resulting in a toner 5. The physical properties are shown in Table 1.

(Manufacturing of Toner Accommodating Container 5)

Using each toner, and each toner accommodating container described in Tables 2 and 3, a toner accommodating container 5 was obtained in the same manner as with the toner accommodating container 1.

(Evaluation of Toner Accommodating Container 5)

The resulting toner accommodating container 5 was evaluated on the toner degradation degree. The results are shown in Table 3.

Example 6

(Manufacturing of Toner 6)

A toner 6 was obtained in the same manner, except for changing 3.0 parts of an ethylene glycol type surfactant in <Preparation of binding resin particle dispersed solution> to 1.5 parts in the <Manufacturing of toner 5>. The physical properties are shown in Table 1.

(Manufacturing of Toner Accommodating Container 6)

Using each toner, and each toner accommodating container described in Tables 2 and 3, a toner accommodating container 6 was obtained in the same manner as with the toner accommodating container 1.

(Evaluation of Toner Accommodating Container 6)

The resulting toner accommodating container 6 was evaluated on the toner degradation degree. The results are shown in Table 3.

Example 7

(Manufacturing of Toner 7)

A toner 7 was obtained in the same manner, except for changing 3.0 parts of an ethylene glycol type surfactant in <Preparation of binding resin particle dispersed solution> to 2.0 parts in the <Manufacturing of toner 5>. The physical properties are shown in Table 1.

(Manufacturing of Toner Accommodating Container 7)

Using each toner, and each toner accommodating container described in Tables 2 and 3, a toner accommodating container 7 was obtained in the same manner as with the toner accommodating container 7.

(Evaluation of Toner Accommodating Container 7)

The resulting toner accommodating container 7 was evaluated on the toner degradation degree. The results are shown in Table 3.

Example 8

(Manufacturing of Toner 8)

A toner 8 was obtained in the same manner, except for changing 3.0 parts of an ethylene glycol type surfactant in <Preparation of binding resin particle dispersed solution> to 4.0 parts in the <Manufacturing of toner 5>. The physical properties are shown in Table 1.

(Manufacturing of Toner Accommodating Container 8)

Using each toner, and each toner accommodating container described in Tables 2 and 3, a toner accommodating container 8 was obtained in the same manner as with the toner accommodating container 8.

(Evaluation of Toner Accommodating Container 8)

The resulting toner accommodating container 8 was evaluated on the toner degradation degree. The results are shown in Table 3.

Example 9

(Manufacturing of Toner 9)

A toner 9 was obtained in the same manner, except for changing 3.0 parts of an ethylene glycol type surfactant in <Preparation of binding resin particle dispersed solution> to 5.0 parts in the <Manufacturing of toner 5>. The physical properties are shown in Table 1.

(Manufacturing of Toner Accommodating Container 9)

Using each toner, and each toner accommodating container described in Tables 2 and 3, a toner accommodating container 9 was obtained in the same manner as with the toner accommodating container 9.

(Evaluation of Toner Accommodating Container 9)

The resulting toner accommodating container 9 was evaluated on the toner degradation degree. The results are shown in Table 3.

Example 10

(Manufacturing of Toner 10)

A toner 10 was obtained in the same manner, except for changing RX 300 (1.4 parts by mass) to RX 300 (3.2 parts by mass) in the (Manufacturing of toner 1). The physical properties are shown in Table 1.

(Manufacturing of Toner Accommodating Container 10)

Using each toner, and each toner accommodating container described in Tables 2 and 3, a toner accommodating container 10 was obtained in the same manner as with the toner accommodating container 1.

(Evaluation of Toner Accommodating Container 10)

The resulting toner accommodating container 10 was evaluated on the toner degradation degree. The results are shown in Table 3.

Examples 11 to 13

(Manufacturing of Toner Accommodating Containers 11 to 13)

Using each toner, and each toner accommodating container described in Tables 2 and 3, toner accommodating containers 11 to 13 were obtained in the same manner as with the toner accommodating container 1.

(Evaluation of Toner Accommodating Containers 11 to 13)

The resulting toner accommodating containers 11 to 13 were evaluated on the toner degradation degree. The results are shown in Table 3.

Example 14

(Manufacturing of Toner 12)

<Manufacturing of Toner Particle 12>

Binder resin A: 80.0 parts (styrene acrylic resin with a mass ratio of styrene and n-butyl acrylate of 78:22; Mw=180000, Tg=58° C.)

Binding rein B: 20.0 parts (styrene acrylic resin with a mass ratio of styrene and n-butyl acrylate of 90:10; Mw=5300, Tg=58° C.)

Hydrocarbon wax (paraffin wax HNP-9 NIPPON SEIRO Co., Ltd.): 5.0 parts

Aluminum 3,5-di-t-butyl salicylate compound: 0.5 part

Carbon black: 5.0 parts

The materials were mixed at a rotation rate of 20 s−1 for a rotation time of 5 min using a Henschel mixer (FM-75 model, manufactured by Mitsui Mining Co., Ltd.), and then were kneaded (a number of kneading of 2) with a biaxial kneader (PCM-30 model, manufactured by Ikegai Corp.) set at a temperature of 130° C. The resulting kneaded product was cooled to 25° C., and was coarsely pulverized by a hammer mill to 1 mm or less, resulting in a coarsely pulverized product. The resulting coarsely pulverized product was pulverized by a mechanical pulverizer (T-250, manufactured by Turbo Industries Co., Ltd.). Using a multi-division classifier using the Coanda effect, classification was performed, resulting in a toner particle 12 with a particle diameter of 8.9 μm.

<Manufacturing of Toner 12>

A toner particle 12 (100 parts by mass) and a silica particle RX300 (manufactured by Japan Aerogel Co.) (1.1 parts by mass) were dry mixed under the condition of 3600 rpm for 12 minutes by a Henschel mixer FM10C (manufactured by Mitsui Mining Co., Ltd), resulting in a toner 12. The physical properties are shown in Table 1.

(Manufacturing of Toner Accommodating Container 15)

Using each toner, and each toner accommodating container described in Tables 2 and 3, a toner accommodating container 15 was obtained in the same manner as with the toner accommodating container 1.

(Evaluation of Toner Accommodating Container 15)

The resulting toner accommodating container 15 was evaluated on the toner degradation degree. The results are shown in Table 3.

Comparative Example 1

(Manufacturing of Toner 11)

<Manufacturing of Toner Particle 11>

Binder resin A: 80.0 parts (styrene acrylic resin with a mass ratio of styrene and n-butyl acrylate of 78:22; Mw=180000, Tg=58° C.)

Binding rein B: 20.0 parts (styrene acrylic resin with a mass ratio of styrene and n-butyl acrylate of 90:10; Mw=5300, Tg=58° C.)

Hydrocarbon wax (paraffin wax HNP-9 NIPPON SEIRO Co., Ltd.): 5.0 parts

Aluminum 3,5-di-t-butyl salicylate compound: 0.5 part

Carbon black: 5.0 parts

The materials were mixed at a rotation rate of 20 s−1 for a rotation time of 5 min using a Henschel mixer (FM-75 model, manufactured by Mitsui Mining Co., Ltd.), and then were kneaded (a number of kneading of 2) with a biaxial kneader (PCM-30 model, manufactured by Ikegai Corp.) set at a temperature of 130° C. The resulting kneaded product was cooled to 25° C., and was coarsely pulverized to 1 mm or less by a hammer mill, resulting in a coarsely pulverized product. The resulting coarsely pulverized product was pulverized by a mechanical pulverizer (T-250, manufactured by Turbo Industries Co., Ltd.). Using a multi-division classifier using the Coanda effect, classification was performed, resulting in a toner particle 11 with a particle diameter of 9.6 μm.

<Manufacturing of Toner 11>

A toner particle 11 (100 parts by mass) and a silica particle RX300 (manufactured by Japan Aerogel Co.) (1.5 parts by mass) were dry mixed under the condition of 3600 rpm for 12 minutes by a Henschel mixer FM10C (manufactured by Mitsui Mining Co., Ltd), resulting in a toner 11. The physical properties are shown in Table 1.

(Manufacturing of Toner Accommodating Container 14)

Using each toner, and each toner accommodating container described in Tables 2 and 3, a toner accommodating container 14 was obtained in the same manner as with the toner accommodating container 1.

(Evaluation of Toner Accommodating Container 14)

The resulting toner accommodating container 14 was evaluated on the toner degradation degree. The results are shown in Table 3.

The evaluation as practicable could be obtained in Example 1 using the toner 1. Accordingly, the content of a silica particle (external additive) is preferably 1.4 mass % or more. Further, better evaluation could be obtained in Example 4 using the toner 4. Accordingly, the more preferable content of a silica particle (external additive) is 2.0 mass % or more.

The evaluation as practicable could be obtained in Example 1 using the toner 1. Accordingly, the coverage by a silica particle of the toner particle surface is preferably 34% or more. The evaluation as practicable could be obtained in Example 10 using toner 10. Accordingly, the coverage by a silica particle of the toner particle surface is preferably 80% or less. Further, according to the interpolation from the coverage with the toner evaluated as practical, the coverage by a silica particle of the toner particle surface can be said to be more preferably at least 39% and not more than 75%. As described up to this point, use of the toner described in each Example enables reduction of degradation of the toner even when the toner is accommodated in a flexible bag. Namely, even when the toner accommodating container accommodating the toner therein receives the self weight of the toner, the external force applied to the bag, the external force upon loading storage, or the like at the time of storage or transport, the toner is less likely to form a compacted state, so that degradation of the toner is reduced.

The present invention can provide a technology for reducing the degradation of a toner even when the toner is accommodated in a flexible container.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A toner accommodating container comprising:

a bag-shaped accommodating portion having flexibility; and a toner accommodated in the accommodating portion and including a silica particle, wherein the toner has a value of Total Energy of 300 mJ or less in measurement of the Total Energy when a propeller type blade is caused to penetrate a surface of a powder layer of the toner manufactured by applying a vertical load of 88 kPa in a measurement container in a powder flowability measurement device while the propeller type blade is being rotated at a peripheral speed of 100 mm/see of an outermost edge portion thereof.

2. The toner accommodating container according to claim 1, wherein a content of the silica particle in the toner is at least 1.4 mass %.

3. The toner accommodating container according to claim 2, wherein the content of the silica particle in the toner is at least 2.0 mass %.

4. The toner accommodating container according to claim 2, wherein a coverage of a particle surface of the toner by the silica particle is at least 34% and not more than 80%.

5. The toner accommodating container according to claim 4, wherein the coverage of the particle surface of the toner by the silica particle is at least 39% and not more than 75%.

6. The toner accommodating container according to claim 1, wherein after the toner is shaken in the toner accommodating container at an amplitude of 80 mm and at 150 times/min for 5 minutes, a degree of agglomeration of the toner discharged is 40% or less.

7. The toner accommodating container according to claim 1, wherein the toner includes hydrotalcite particles including fluorine.

8. The toner accommodating container according to claim 7, wherein with line analysis in STEM-EDS mapping analysis, fluorine is present in an inside of the hydrotalcite particle included in the toner.

9. The toner accommodating container according to claim 7, wherein the bag-shaped accommodating portion is formed of a resin sheet.

10. The toner accommodating container according to claim 9, wherein the resin sheet is at least any of a polypropylene sheet, a polyethylene sheet, and a PET sheet.

11. The toner accommodating container according to claim 9, wherein a thickness of the resin sheet is at least 25 μm and not more than 300 μm.

12. The toner accommodating container according to claim 1, wherein the toner includes a surfactant, and a P/N ratio that is a ratio of a positive component of the surfactant and a negative component of the surfactant is at least 0.1 and not more than 0.8.

13. The toner accommodating container according to claim 12, wherein the P/N ratio of the toner is at least 0.2 and not more than 0.6.

* * * * *